US010000349B2

(12) United States Patent
Tamura

(10) Patent No.: US 10,000,349 B2
(45) Date of Patent: Jun. 19, 2018

(54) DRIVE TRANSMISSION DEVICE AND SHEET CONVEYING DEVICE AND IMAGE FORMING APPARATUS PROVIDED WITH SAME

(71) Applicant: KYOCERA Document Solutions Inc., Osaka-shi (JP)

(72) Inventor: Yuki Tamura, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days. days.

(21) Appl. No.: 15/784,414

(22) Filed: Oct. 16, 2017

(65) Prior Publication Data

US 2018/0115677 A1    Apr. 26, 2018

(30) Foreign Application Priority Data

Oct. 21, 2016 (JP) .................................. 2016-206819

(51) Int. Cl.
*B65H 5/06* (2006.01)
*G03G 15/00* (2006.01)
*F16H 1/10* (2006.01)
*B65H 85/00* (2006.01)

(52) U.S. Cl.
CPC ............... *B65H 5/06* (2013.01); *B65H 85/00* (2013.01); *F16H 1/10* (2013.01); *G03G 15/6529* (2013.01); *B65H 2403/42* (2013.01); *B65H 2403/481* (2013.01); *B65H 2403/80* (2013.01); *B65H 2403/942* (2013.01); *B65H 2513/412* (2013.01)

(58) Field of Classification Search
CPC .......... B65H 2403/942; B65H 2403/80; B65H 2403/481; B65H 2403/42; B65H 2513/412
See application file for complete search history.

(56) References Cited

U.S. PATENT DOCUMENTS

| 5,585,898 | A | * | 12/1996 | Fujii | G03G 15/0126 |
| | | | | | 399/228 |
| 9,857,749 | B2 | * | 1/2018 | Ochi | G03G 15/6529 |
| 2013/0035197 | A1 | * | 2/2013 | Sartori | B64C 27/12 |
| | | | | | 475/344 |
| 2015/0301492 | A1 | * | 10/2015 | Ochi | B65H 85/00 |
| | | | | | 271/225 |
| 2017/0183061 | A1 | * | 6/2017 | Yamamoto | B62M 6/55 |

FOREIGN PATENT DOCUMENTS

| JP | H09211921 A | | 8/1997 |
| JP | 2015004376 A | * | 1/2015 |
| JP | 5914417 | | 5/2016 |

OTHER PUBLICATIONS

European Search Report dated Feb. 14, 2018.
European Search Report dated Feb. 23, 2018.

* cited by examiner

*Primary Examiner* — Patrick Cicchino
(74) *Attorney, Agent, or Firm* — Gerald E. Hespos; Michael J. Porco; Matthew T. Hespos

(57) ABSTRACT

A rotary arm restricts the rotation of a first sun gear or a second sun gear according to forward/reverse rotation drive of sheet discharge rollers. As a result, a rotating direction of a transmission gear coupled to the sheet discharge rollers is switched. If θ1A denotes a pressure angle of gear teeth of a gear portion of the first sun gear and θ2A denotes a pressure angle of gear teeth of a first planetary gear, a relationship of θ2A+0.5°≤θ1A≤θ2A+1.5° is satisfied.

7 Claims, 16 Drawing Sheets

DRIVE TRANSMISSION DEVICE AND SHEET CONVEYING DEVICE AND IMAGE FORMING APPARATUS PROVIDED WITH SAME

This application is based on Japanese Patent Application No. 2016-206819 filed with the Japan Patent Office on Oct. 21, 2016, the contents of which are hereby incorporated by reference.

BACKGROUND

The present disclosure relates to a drive transmission device for transmitting a rotational drive force to a rotary body, and a sheet conveying device and an image forming apparatus provided with the same.

Conventionally, a drive transmission device is known which transmits a rotational drive force to a rotary body. The drive transmission device transmits a rotational drive force to a conveyor roller pair of an image forming apparatus. The conveyor roller pair conveys a sheet in a predetermined direction. Further, sun gears and planetary gears are used in the drive transmission device. In this technique, two sun gears are provided and rotating directions of the conveyor rollers are controlled by selectively fixing the rotation of either one of the sun gears.

SUMMARY

A drive transmission device according to one aspect of the present disclosure includes a rotary body, a driver and a transmitter. The rotary body has a rotary shaft and rotates about the rotary shaft in a first rotating direction and a second rotating direction opposite to the first rotating direction. The driver includes a motor switchable between drive stop and forward rotation drive and capable of converting a rotational drive force generated by the motor in the forward rotation drive into mutually different rotating directions. The transmitter rotates the rotary body in the first rotating direction and the second rotating direction by transmitting the rotational drive force from the driver to the rotary body. The transmitter includes a transmission gear coupled to the transmitter. The driver includes a first planetary gear mechanism, a second planetary gear mechanism and a switcher. The first planetary gear mechanism is coupled to the motor and the transmission gear and transmits the rotational drive force of the motor to the transmission gear. The second planetary gear mechanism is coupled to the first planetary gear mechanism and the transmission gear and transmits the rotational drive force of the motor to the transmission gear. The switcher changes rotating directions of the first and second planetary gear mechanisms in correspondence with a rotating direction of the rotary body. The first planetary gear mechanism includes a first input gear, a first output gear, a first sun gear and a first planetary gear. The first input gear has a first shaft portion, and the rotational drive force of the motor is input to the first input gear. The first output gear has a first outer peripheral gear portion to be engaged with the transmission gear and a first inner peripheral gear portion, is arranged to face one side part of the first input gear on the same axis as the first input gear and rotatable about the first shaft portion, and transmits the rotational drive force to the transmission gear. The first sun gear has a first exposed gear portion exposed on the one side part of the first input gear and is arranged to face another side part of the first input gear on the same axis as the first input gear and rotatable about the first shaft portion. The first planetary gear is supported in such a manner as to be capable of rotating and revolving about the first shaft portion on the one side part of the first input gear, and engaged with the first inner peripheral gear portion and the first exposed gear portion. The second planetary gear mechanism includes a second input gear, a second output gear, a second sun gear and a second planetary gear. The second input gear has a second shaft portion and is engaged with the first input gear, and the rotational drive force of the motor is input to the second input gear. The second output gear has a second outer peripheral gear portion to be engaged with the transmission gear and a second inner peripheral gear portion, is arranged to face one side part of the second input gear on the same axis as the second input gear and rotatable about the second shaft portion and transmits the rotational drive force to the transmission gear. The second sun gear has a second exposed gear portion exposed on the one side part of the second input gear and is arranged to face another side part of the second input gear on the same axis as the second input gear and rotatable about the second shaft portion. The second planetary gear is supported in such a manner as to be capable of rotating and revolving about the second shaft portion on the one side part of the second input gear and engaged with the second inner peripheral gear portion and the second exposed gear portion. The switcher includes a switching member configured to engage one of the first and second sun gears, thereby restricting the rotation of the one sun gear and permitting the rotation of the other sun gear. The transmission gear is rotated in a third rotating direction by the first and second output gears to rotate the rotary body in the first rotating direction when the rotation of the first sun gear is restricted by the switching member, and the transmission gear is rotated in a fourth rotating direction opposite to the third rotating direction by the first and second output gears to rotate the rotary body in the second rotating direction when the rotation of the second sun gear is restricted by the switching member. Relationships of $\theta 2A+0.5° \leq \theta 1A \leq \theta 2A+1.5°$ and $\theta 2B+0.5° \leq \theta 1B \leq \theta 2B+1.5°$ are satisfied if $\theta 1A(°)$ denotes a pressure angle of gear teeth of the first exposed gear portion of the first sun gear and $\theta 2A(°)$ denotes a pressure angle of gear teeth of the first planetary gear in meshing between the gear teeth of the first exposed gear portion and the gear teeth of the first planetary gear and $\theta 1B(°)$ denotes a pressure angle of gear teeth of the second exposed gear portion of the second sun gear and $\theta 2B(°)$ denotes a pressure angle of gear teeth of the second planetary gear in meshing between the gear teeth of the second exposed gear portion and the gear teeth of the second planetary gear.

Further, a sheet conveying device according to another aspect of the present disclosure includes the above drive transmission device, and a conveyor roller configured to convey a sheet, the conveyor roller serving as the rotary body.

Further, an image forming apparatus according to another aspect of the present disclosure includes an apparatus body, an image forming unit, a sheet conveyance path, the above sheet conveying device and a sheet discharging portion. The image forming unit is arranged in the apparatus body and forms an image on a sheet. The sheet conveyance path allows the sheet to pass through the image forming unit. The sheet conveying device is arranged in the sheet conveyance path. The sheet having the image formed thereon is discharged to the sheet discharging portion.

DETAILED DESCRIPTION

Figure 1:
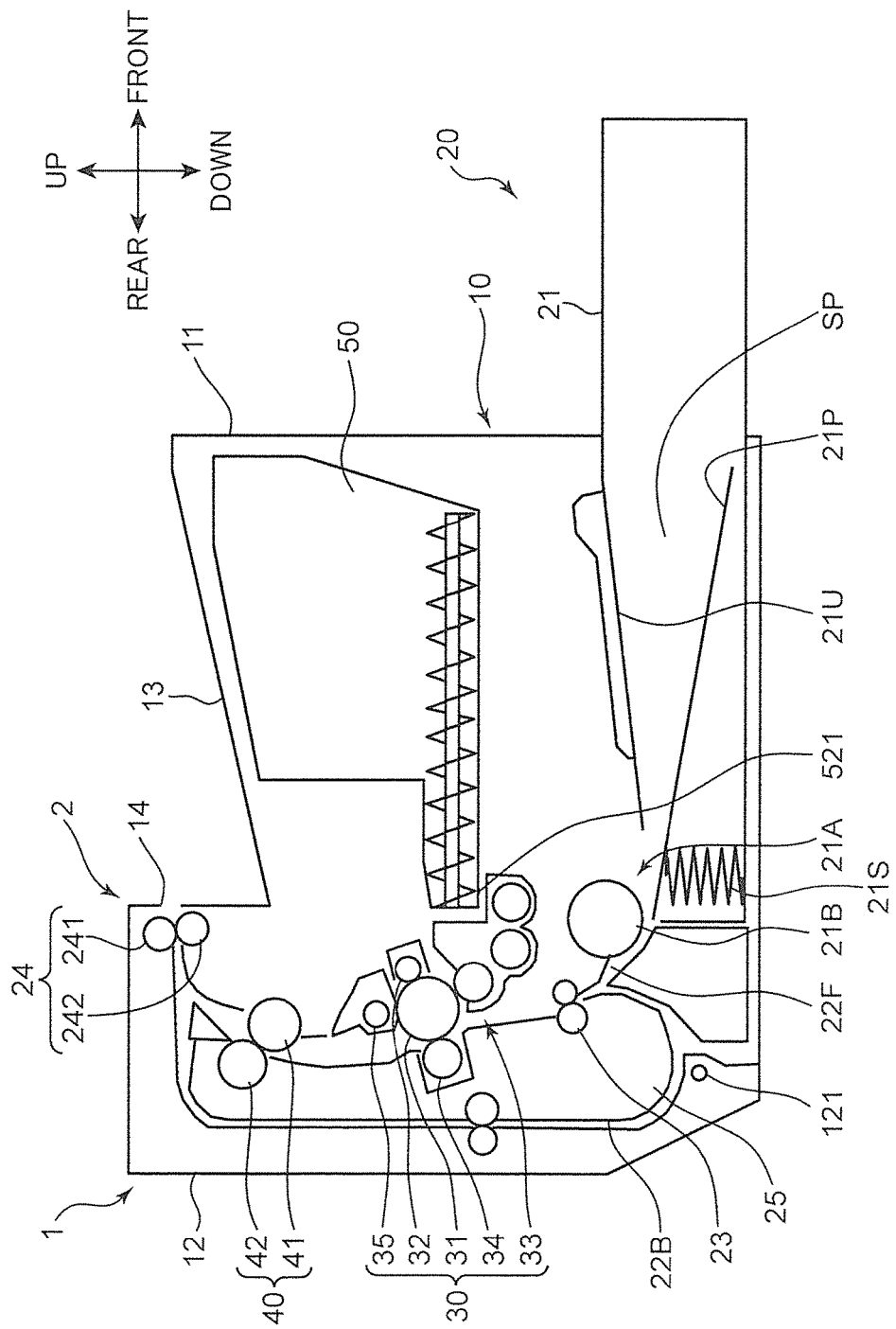
FIG. 1 is a sectional view showing an internal structure of an image forming apparatus according to one embodiment of the present disclosure.
Figure 2:
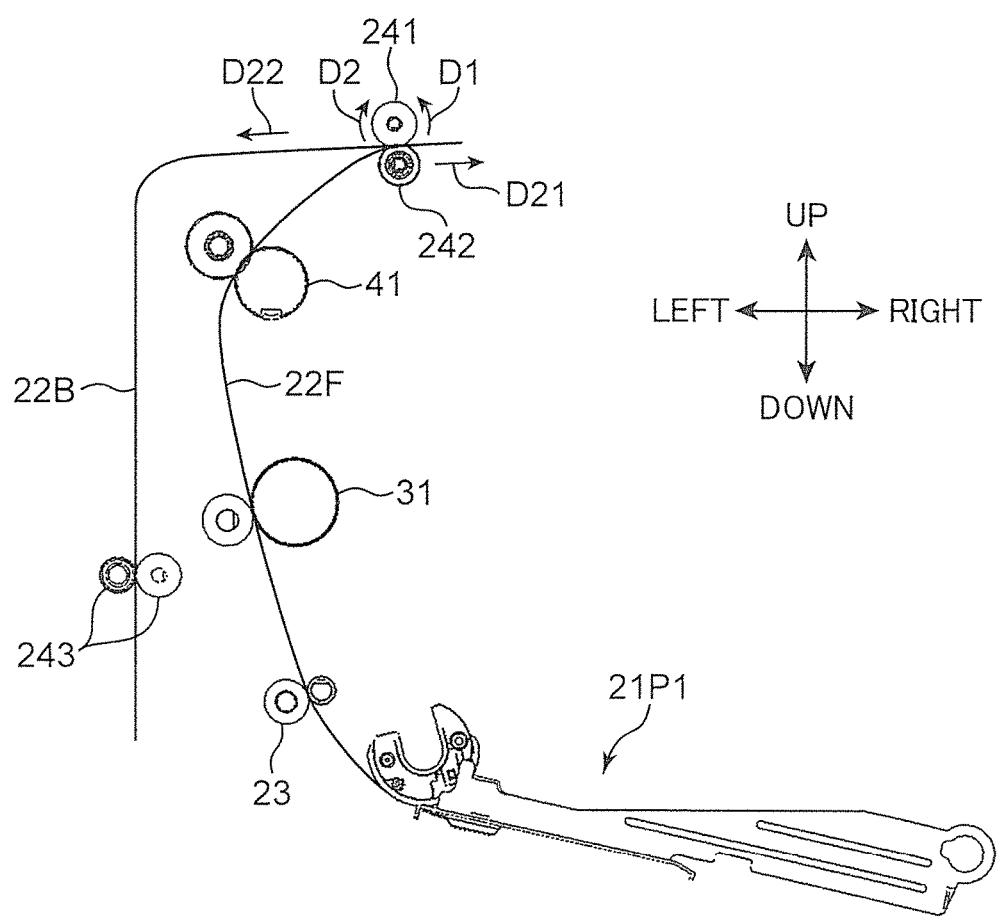
FIG. 2 is a schematic sectional view showing a sheet conveyance path of the image forming apparatus according to the one embodiment of the present disclosure.

Hereinafter, an embodiment of the present disclosure is described with reference to the drawings. FIG. 1 is a side view in section showing an internal structure of an image forming apparatus 1 according to one embodiment of the present disclosure. FIG. 2 is a schematic sectional view showing a main conveyance path 22F and a reversing conveyance path 22B of the image forming apparatus 1. Although a monochrome printer is illustrated as the image forming apparatus 1 here, the image forming apparatus may be a copier, a facsimile machine or a complex machine provided with these functions or an apparatus for forming a color image.

The image forming apparatus 1 includes an apparatus body 10 having a housing structure having a substantially rectangular parallelepiped shape, and a sheet feeding unit 20, an image forming unit 30, a fixing unit 40 and a toner container 50 housed in this apparatus body 10.

A front cover 11 and a rear cover 12 are respectively provided on a front surface side and a rear surface side of the apparatus body 10. By opening the front cover 11, the toner container 50 is exposed. In this way, a user can pull out the toner container 50 from the front surface side of the apparatus body 10 when toner runs out. The rear cover 12 is a cover opened at the time of a sheet jam or maintenance. Each unit of the image forming unit 30 and the fixing unit 40 can be pulled out from the rear surface side of the apparatus body 10 by opening the rear cover 12. Further, an unillustrated left cover and an unillustrated right cover on a side opposite to the left cover are respectively disposed on side surfaces of the apparatus body 10 to extend in a vertical direction. Further, a sheet discharging portion 13 to which a sheet having an image formed thereon is to be discharged is provided on the upper surface of the apparatus body 10. Various devices for performing image formation are housed in an internal space defined by the front cover 11, the rear cover 12, the left cover, the right cover and the sheet discharging portion 13.

The sheet feeding unit 20 includes a sheet cassette 21 for storing sheets to which an image forming process is to be applied. The upper surface of a part of the sheet cassette 21 housed in the apparatus body 10 is covered by a sheet cassette ceiling plate 21U.

The sheet cassette 21 includes a sheet storage space SP for storing a bundle of the sheets and a lift plate 21 configured to be lifted up by a spring 21S to feed the sheets of the bundle. Further, a pair of side walls 21P1 (see FIG. 2) are arranged on both end parts of the lift plate 21P in a sheet width direction. A sheet delivery unit 21A is provided on a rear end side of the sheet cassette 21. A sheet feed roller 21B for feeding the uppermost sheet of the sheet bundle on the lift plate 21P one by one in a sheet conveying direction is arranged in this sheet delivery unit 21A.

The image forming unit 30 performs an image forming process of forming a toner image on the sheet fed from the sheet feeding unit 20. The image forming unit 30 includes a photoconductive drum 31 and a charging device 32, an exposure device (not shown in FIG. 1), a developing device 33, a transfer roller 34 and a cleaning device 35 arranged around this photoconductive drum 31. The image forming unit 30 is disposed between the left and right covers.

The photoconductive drum 31 rotates about a shaft thereof and an electrostatic latent image and a toner image are formed on a peripheral surface thereof. The charging device 32 is for uniformly charging the surface of the photoconductive drum 31, and includes a charging roller in contact with the photoconductive drum 31. The cleaning device 35 includes a cleaning blade and the like, cleans toner adhering to the peripheral surface of the photoconductive drum 31 after the transfer of the toner image and conveys the cleaned toner to an unillustrated collection device.

The exposure device includes optical devices such as a laser light source, a mirror and a lens and forms an electrostatic latent image by irradiating light modulated based on image data given from an external apparatus such as a personal computer to the peripheral surface of the photoconductive drum 31. The developing device 33 supplies the toner to the peripheral surface of the photoconductive drum 31 to develop the electrostatic latent image on the photoconductive drum 31 and form a toner image.

The transfer roller 34 is a roller for transferring a toner image formed on the peripheral surface of the photoconductive drum 31 to a sheet and forms a transfer nip portion together with the photoconductive drum 31. A transfer bias having a polarity opposite to that of the toner is given to this transfer roller 34.

The fixing unit 40 performs a fixing process of fixing a transferred toner image onto a sheet. The fixing unit 40 includes a fixing roller 41 having a heating source inside and a pressure roller 42 configured to form a fixing nip portion between the fixing roller 41 and the pressure roller 42 by being pressed into contact with the fixing roller 41. When a sheet having a toner image transferred thereto is passed through the fixing nip portion, the toner image is fixed onto the sheet by being heated by the fixing roller 41 and pressed by the pressure roller 42.

The toner container 50 stores the toner to be supplied to the developing device 33 through a supply port 521.

The main conveyance path 22F (sheet conveyance path) and the reversing conveyance path 22B are provided in the apparatus body 10 to convey a sheet (FIGS. 1 and 2). The main conveyance path 22F extends from the sheet delivery unit 21A of the sheet feeding unit 20 to a sheet discharge opening 14 provided to face the sheet discharging portion 13 on the upper surface of the apparatus body 10 via the image forming unit 30 and the fixing unit 40. Specifically, the main conveyance path 22F is a conveyance path along which the sheet is conveyed to pass through the image forming unit 30. The main conveyance path 22F is a conveyance path for conveying the sheet on the lift plate 21P of the sheet cassette 21 in the predetermined sheet conveying direction. The reversing conveyance path 22B is a conveyance path for returning a sheet printed on one side to a part of the main conveyance path 22F upstream of the image forming unit 30 in printing both sides of the sheet. A duplex conveyor roller pair 342 (FIG. 2) is arranged in the reversing conveyance path 22B.

Registration rollers 23 are arranged in a part of the main conveyance path 22F upstream of the transfer nip portion between the photoconductive drum 31 and the transfer roller 34. In other words, the registration rollers 23 are arranged downstream of the sheet feed roller 21B in the sheet conveying direction. The registration rollers 23 regulate the position of the sheet in a sheet width direction perpendicular to the sheet conveying direction. Further, the sheet is temporarily stopped at the registration rollers 23 and fed to the transfer nip portion at a predetermined timing for image transfer after a skew correction is made. A plurality of conveyor rollers for conveying the sheet are arranged at suitable positions of the main conveyance path 22F and the reversing conveyance path 22B. For example, sheet discharge roller pairs 24 are arranged near the sheet discharge opening 14. The sheet discharge roller pair 24 includes a sheet discharge roller 241 (rotary body, conveyor roller) and a driven roller 242. The sheet discharge rollers 241 convey a sheet having an image formed on a surface. The driven rollers 242 rotate, following the sheet discharge rollers 241. Note that the sheet discharge roller pairs 24 are arranged on a side near the sheet discharging portion 13 in the main conveyance path 22F. By rotating the sheet discharge rollers 241 in a first direction to be described alter, the sheet is discharged to the sheet discharging portion 13. Further, a sheet conveying device 2 arranged in the main conveyance path 22F for conveying a sheet is constituted by the sheet discharge roller pairs 24 including the sheet discharge rollers 241 and a driving unit 6 to be described later.

The reversing conveyance path 22B is formed between the outer side surface of a reversing unit 25 and the inner surface of the rear cover 12 of the apparatus body 10. Note that the transfer roller 34 and the registration rollers 23 are mounted on the inner side surface of the reversing unit 25. The rear cover 12 and the reversing unit 25 are respectively rotatable about a supporting point portion 121 provided on the lower ends thereof. If a sheet jam occurs in the reversing conveyance path 22B, the rear cover 12 is opened. If a sheet jam occurs in the main conveyance path 22F or if the unit including the photoconductive drum 31 or the developing device 33 is taken out, the reversing unit 25 is opened in addition to the rear cover 12.

<Concerning Driving Unit>

Figure 3:
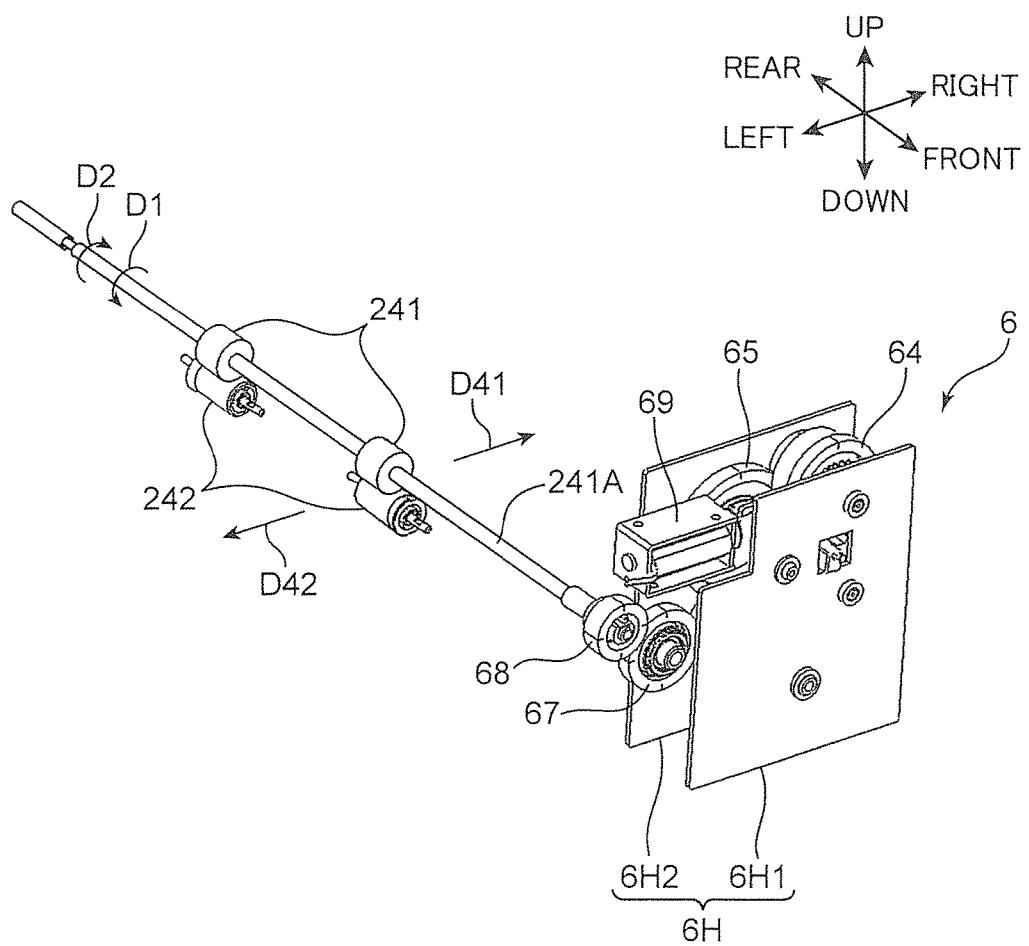
FIG. 3 is a perspective view of a drive transmission device and sheet discharge roller pairs according to the one embodiment of the present disclosure.
Figure 4:
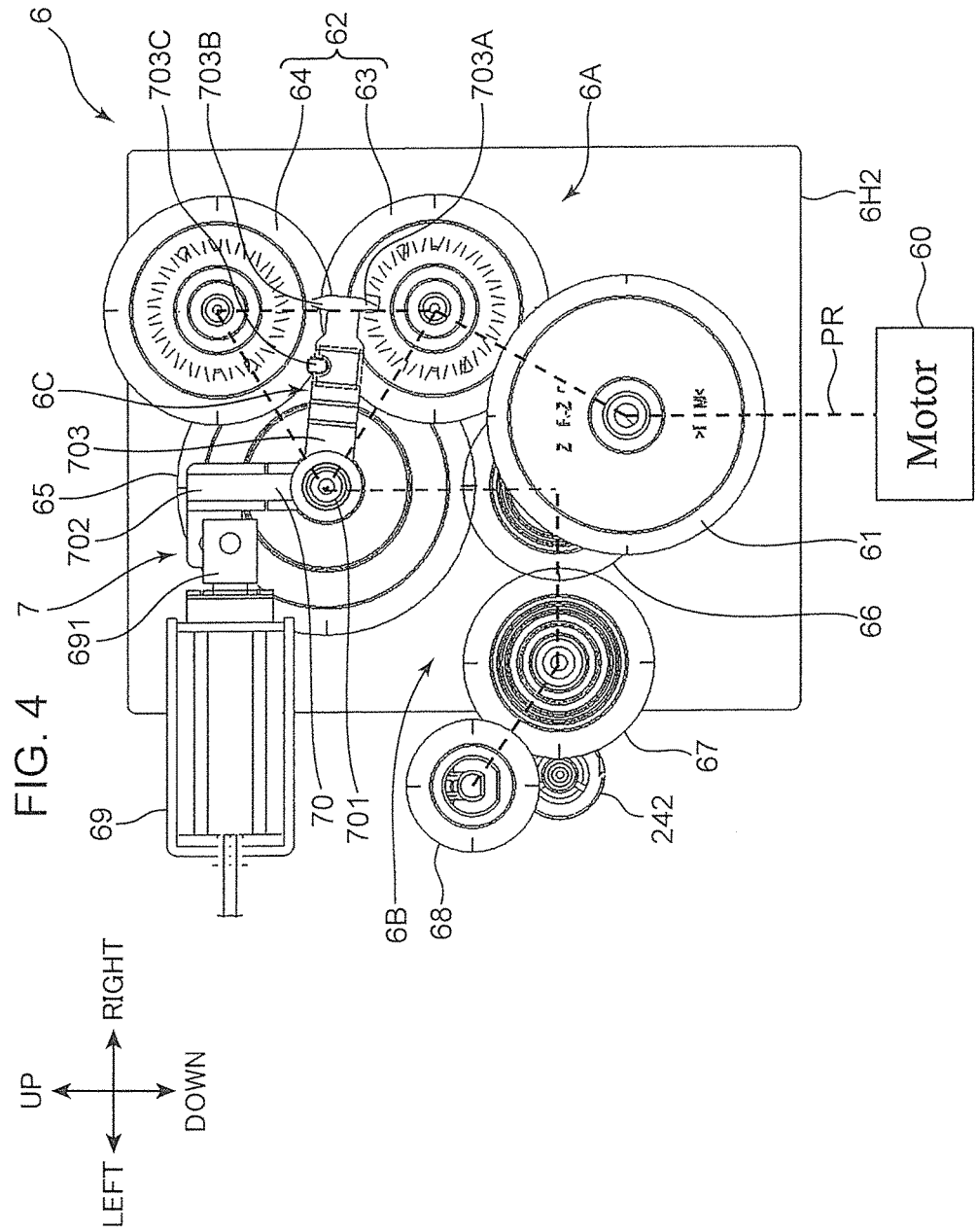
FIG. 4 is a front view showing an internal structure of the drive transmission device according to the one embodiment of the present disclosure.
Figure 5:
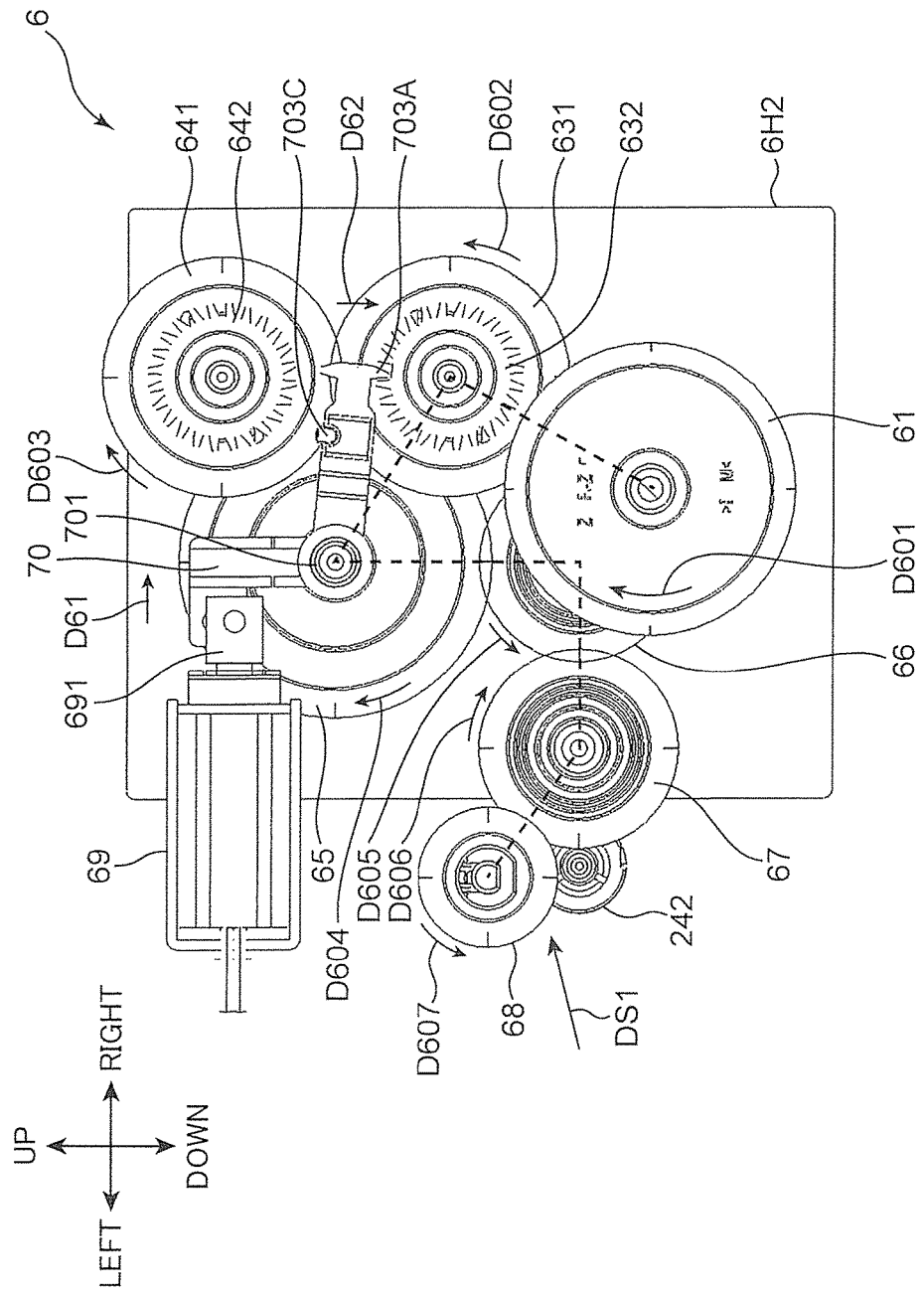
FIG. 5 is a front view of the interior of the drive transmission device when sheet discharge rollers are driven to rotate in a forward direction.
Figure 6:
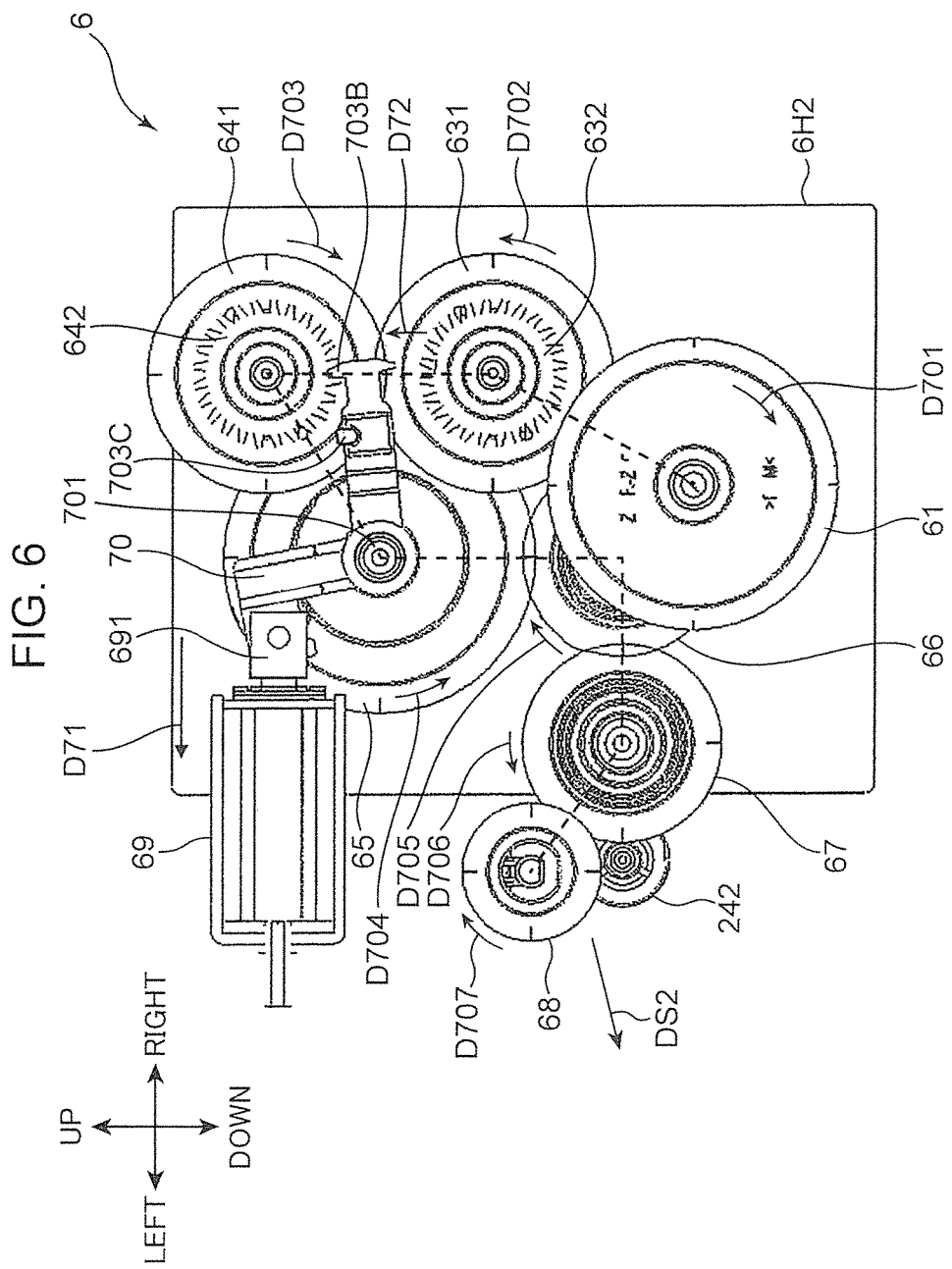
FIG. 6 is a front view of the interior of the drive transmission device when the sheet discharge rollers are driven to rotate in a reverse direction.

Next, the driving unit 6 according to this embodiment is described with reference to FIGS. 3 to 6 in addition to FIGS. 1 and 2. FIG. 3 is a perspective view of the driving unit 6 (drive transmission device) and the aforementioned sheet discharge roller pairs 24 according to this embodiment. FIG. 4 is a front view showing an internal structure of the driving unit 6. FIG. 5 is a front view of the interior of the driving unit 6 when the sheet discharge rollers 241 are driven to rotate in a forward direction. FIG. 6 is a front view of the interior of the driving unit when the sheet discharge rollers 241 are driven to rotate in a reverse direction. Note that gear teeth of each gear are not shown in FIGS. 4 to 6.

The driving unit 6 rotates the aforementioned sheet discharge rollers 241. The driving unit 6 is arranged inside the apparatus body 10. With reference to FIG. 3, the sheet discharge rollers 241 have a sheet discharge roller shaft 241A (rotary shaft). The sheet discharge roller shaft 241A is a rotary shaft in the rotation of the sheet discharge rollers 241. As shown in FIG. 3, a plurality of sheet discharge rollers 241 are arranged at intervals in an axial direction of a sheet discharge roller shaft 241A. Further, a plurality of driven rollers 242 are similarly arranged to respectively face the plurality of sheet discharge rollers 241. A sheet discharge roller gear 68 to be described later is fixed on a front end part of the sheet discharge roller shaft 241A. By rotating the sheet discharge roller shaft 241A by the sheet discharge roller gear 68, the sheet discharge rollers 241 are rotated in the forward and reverse directions.

Specifically, the sheet discharge rollers 241 rotate in the first direction (direction of an arrow D1 of FIGS. 2 and 3) about the sheet discharge roller shaft 241A, thereby discharging a sheet from the main conveyance path 22F toward the sheet discharging portion 13 (FIG. 1) (arrow D21 of FIG. 2, arrow D41 of FIG. 3). Further, the sheet discharge rollers 241 rotate in a second direction (direction of an arrow D2 of FIGS. 2 and 3) opposite to the first direction about the sheet discharge roller shaft 241A, thereby conveying a sheet into the reversing conveyance path 22B (arrow D22 of FIG. 2, arrow D42 of FIG. 3).

The driving unit 6 includes a supporting wall 6H, a driver 6A (FIG. 4), a transmitter 6B (FIG. 4) and a switcher 7 (FIG. 4).

The supporting wall 6H is a housing part of the driving unit 6. The supporting wall 6H includes a first supporting wall 6H1 and a second supporting wall 6H2. As shown in FIG. 3, the first and second supporting walls 6H1, 6H2 are plate-like members extending in the vertical and lateral directions. The first and second supporting walls 6H1, 6H2 are arranged at a predetermined distance from each other in a front-rear direction. Each gear to be described later is rotatably supported on the first and second supporting walls 6H1, 6H2.

The driver 6A can switch between drive stop and forward rotation drive and generates a rotational drive force for rotating the sheet discharge rollers 241 in the first direction in the forward rotation drive. Further, the driver 6A is capable of reverse rotation drive opposite to the forward rotation drive and generates a rotational drive force for rotating the sheet discharge rollers 241 in the second direction in the reverse rotation drive. In this embodiment, the driver 6A rotationally drives a transmission gear 65 (FIG. 4) of the transmitter 6B to be described later in forward and reverse directions. The driver 6A includes a motor 60, a first gear 61 and a planetary gear mechanism 62.

The motor 60 is a motor capable of generating the rotational drive force and rotating in a forward direction. The motor 60 is rotationally driven by an unillustrated controller according to a rotating direction of the sheet discharge rollers 241. Note that, in this embodiment, the motor 60 rotationally drives another member of the image forming apparatus 1. As an example, the aforementioned photoconductive drum 31 is rotated by the motor 60.

The first gear 61 (FIG. 4) is a rotary gear coupled to a drive shaft of the motor 60. The first gear 61 is coupled to a first planetary gear mechanism 63 of the planetary gear mechanism 62 to be described later. Specifically, the first gear 61 is coupled to a first carrier 631 (FIG. 5) of the first planetary gear mechanism 63.

The planetary gear mechanism 62 is composed of two planetary gear assemblies. The planetary gear mechanism 62 transmits the rotational drive force of the motor 60 transmitted to the first gear 61 to the transmission gear 65. At this time, the forward rotation drive of the motor 60 is converted into forward and reverse rotation of the transmission gear 65. The planetary gear mechanism 62 includes a first planetary gear mechanism 63 and a second planetary gear mechanism 64.

The first planetary gear mechanism 63 is coupled to the first gear 61 and the transmission gear 65 and transmits the rotational drive force of the motor 60 to the transmission gear 65. Further, the second planetary gear mechanism 64 is coupled to the first planetary gear mechanism 63 and the transmission gear 65 and transmits the rotational drive force of the motor 60 to the transmission gear 65.

The switcher 7 changes the rotating directions of the first and second planetary gear mechanisms 63, 64 in correspondence with the forward and reverse rotation drives of the transmission gear 65. Note that the structures of the first planetary gear mechanism 63, the second planetary gear mechanism 64 and the switcher 7 are described in detail later.

The transmitter 6B (FIG. 4) is composed of a plurality of gears and transmits the rotational drive force from the driver 6A to the sheet discharge rollers 241. With reference to FIG. 5, the transmitter 6B includes the transmission gear 65, a second gear 66 (second transmission gear), a third gear 67 and the sheet discharge roller gear 68.

The transmission gear 65 is arranged on a most upstream side in the transmission of the rotational drive force out of the plurality of gears of the transmitter 6B. The transmission gear 65 is coupled to the planetary gear mechanism 62 of the driver 6A. The transmission gear 65 includes a transmission gear shaft 65A (see FIG. 7). The transmission gear shaft 65A is a rotary shaft in the rotation of the transmission gear 65. The transmission gear 65 is rotated about the transmission gear shaft 65A.

The second gear 66 is arranged downstream of the transmission gear 65 in the transmission of the rotational drive force out of the plurality of gears of the transmitter 6B, and coupled to the transmission gear 65. The third gear 67 is arranged downstream of the second gear 66 in the transmission of the rotational drive force, and coupled to the second gear 66. Similarly, the sheet discharge roller gear 68 is arranged downstream of the third gear 67 in the transmission of the rotational drive force, and coupled to the third gear 67. Further, the sheet discharge roller gear 68 is fixed to the end part of the sheet discharge roller shaft 241A of the sheet discharge rollers 241 as described above. Note that, in FIG. 4, a broke line PR indicates a transmission path of the rotational drive force from the motor 60 to the sheet discharge roller gear 68. The transmission path of the rotational drive force is shown by broken line also in FIGS. 5 to 7.

<Concerning Planetary Gear Mechanism>

Figure 7:
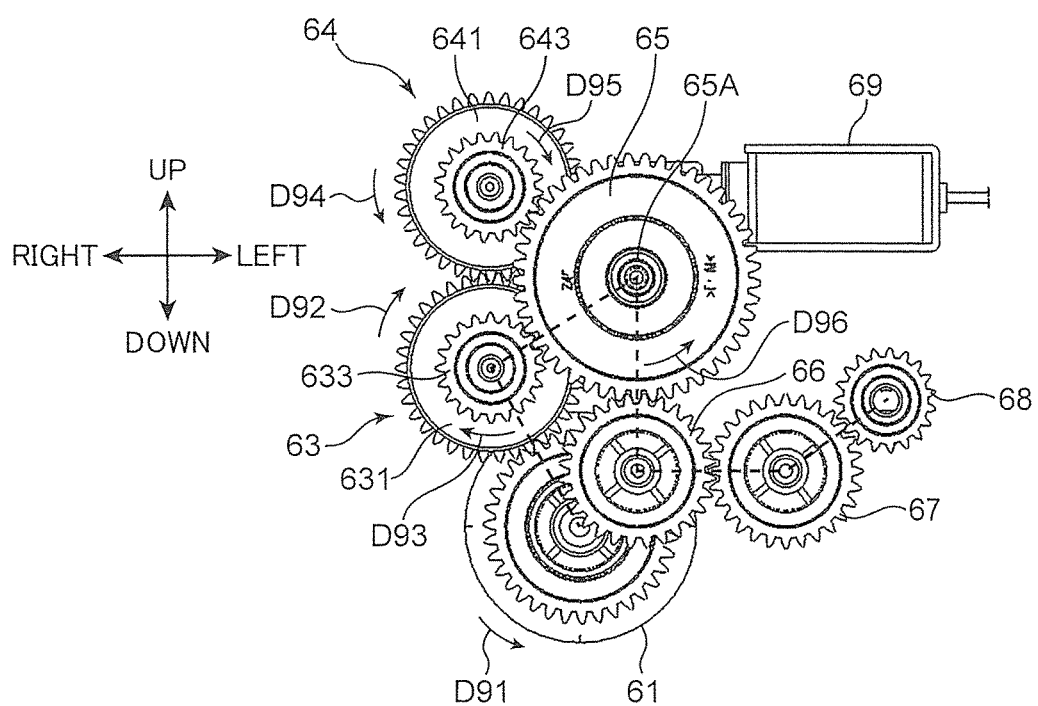
FIG. 7 is a back view of the interior of the drive transmission device according to the one embodiment of the present disclosure.
Figure 8:
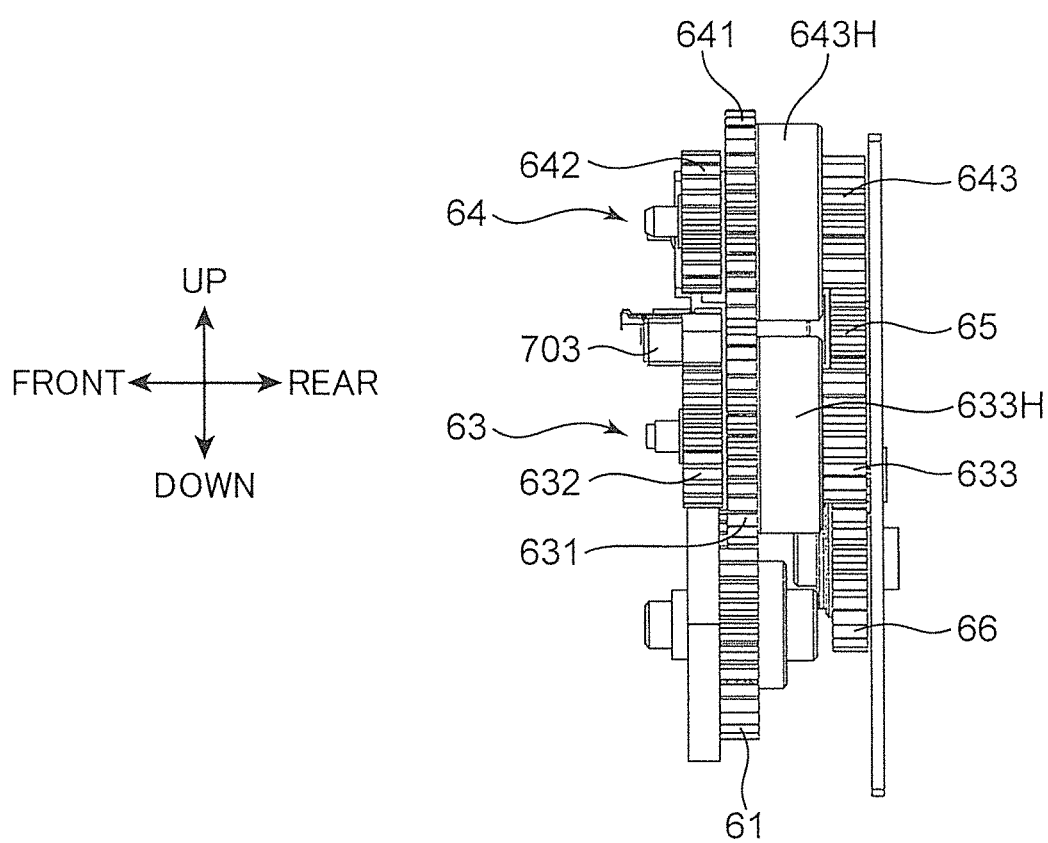
FIG. 8 is a side view of the drive transmission device according to the one embodiment of the present disclosure.
Figure 9:
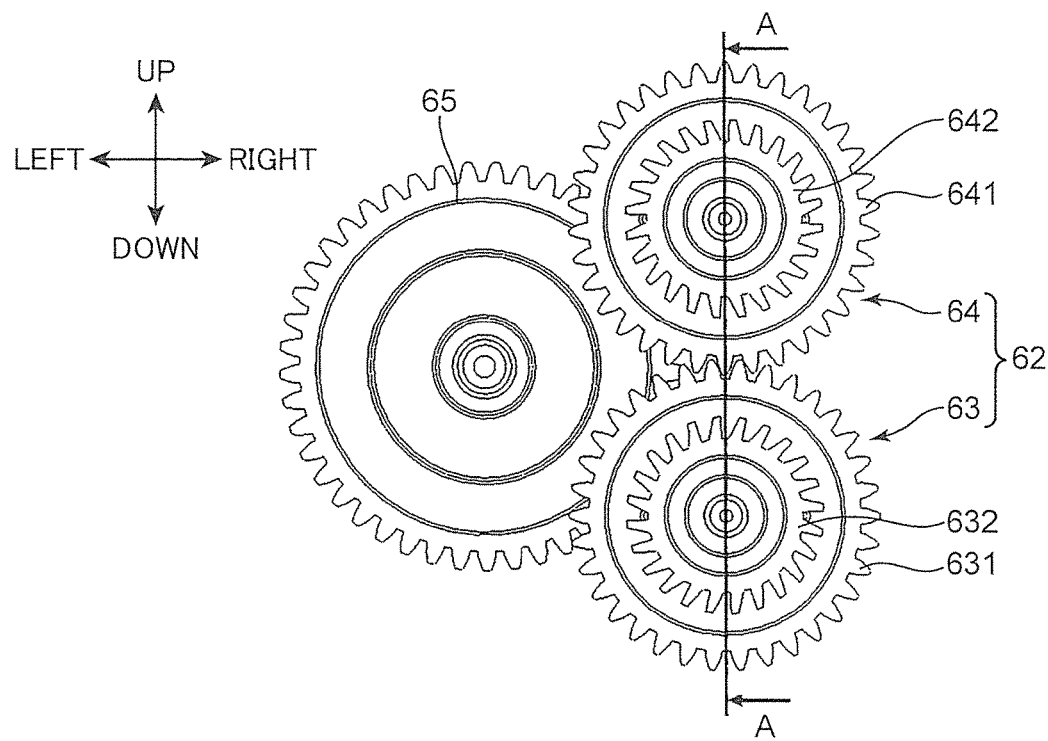
FIG. 9 is a front view of a planetary gear mechanism of the drive transmission device according to the one embodiment of the present disclosure.
Figure 10:
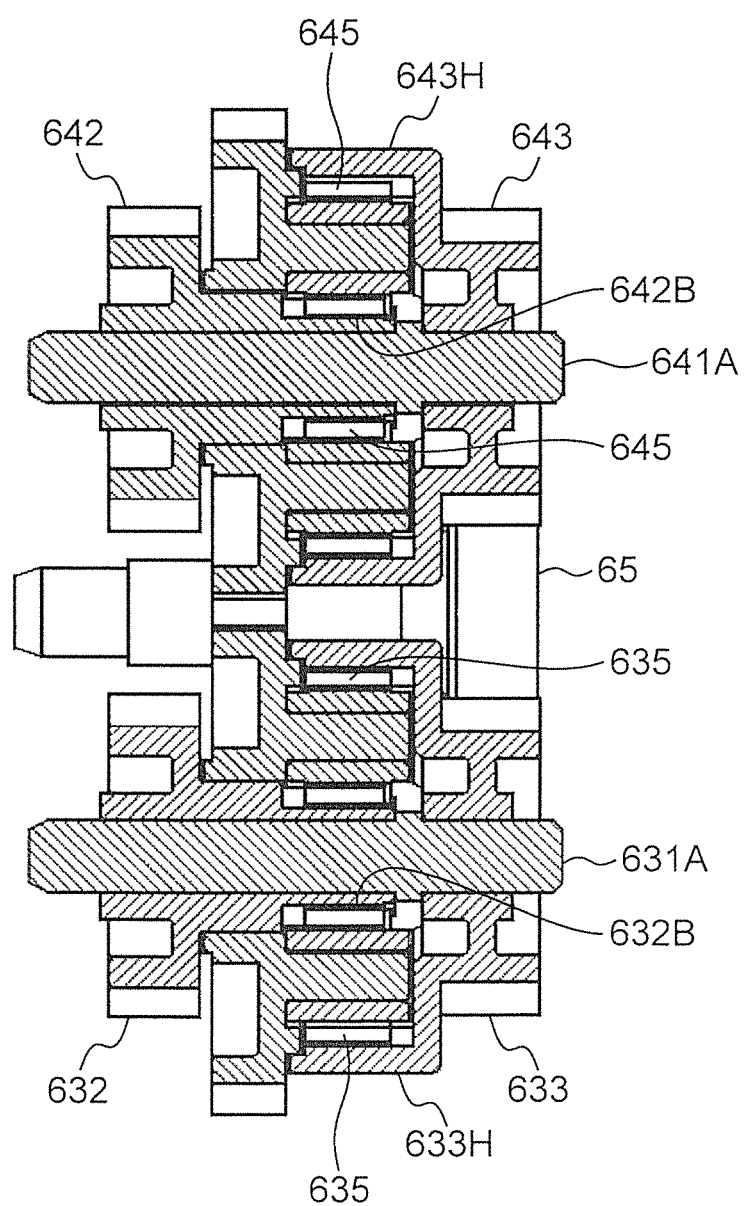
FIG. 10 is a sectional view of the planetary gear mechanism of the drive transmission device according to the one embodiment of the present disclosure.
Figure 11:
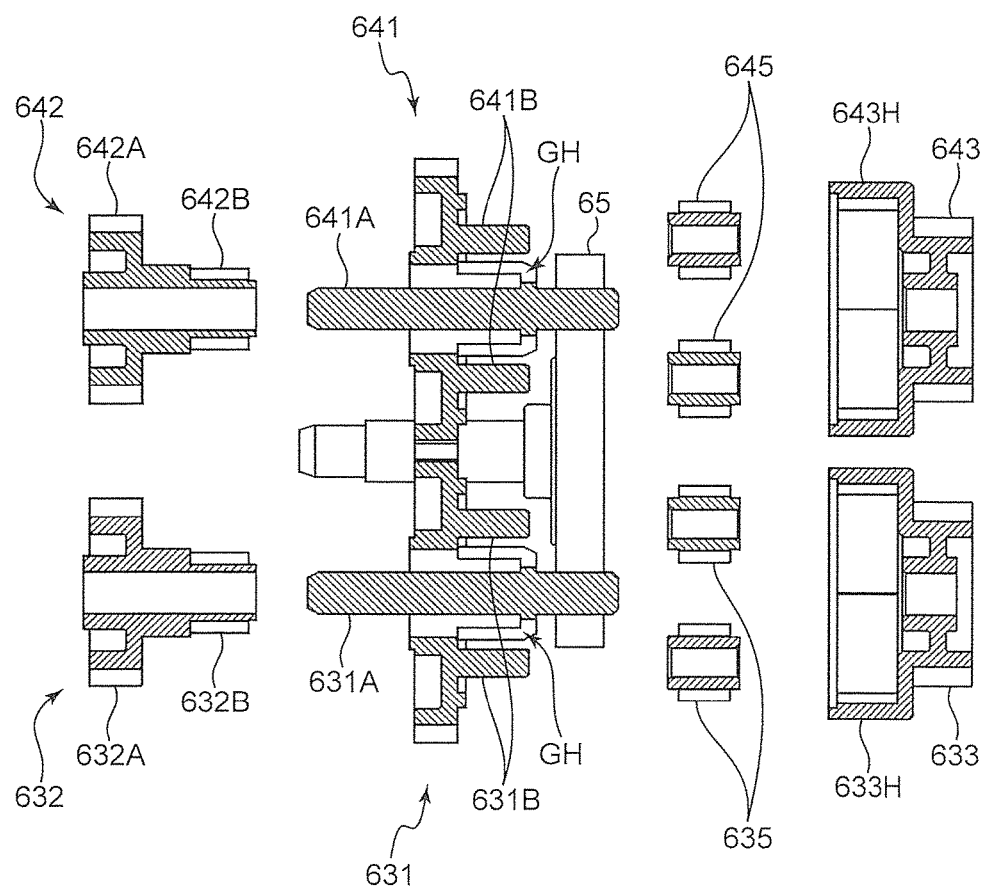
FIG. 11 is an exploded sectional view of the planetary gear mechanism of the drive transmission device according to the one embodiment of the present disclosure.
Figure 12:
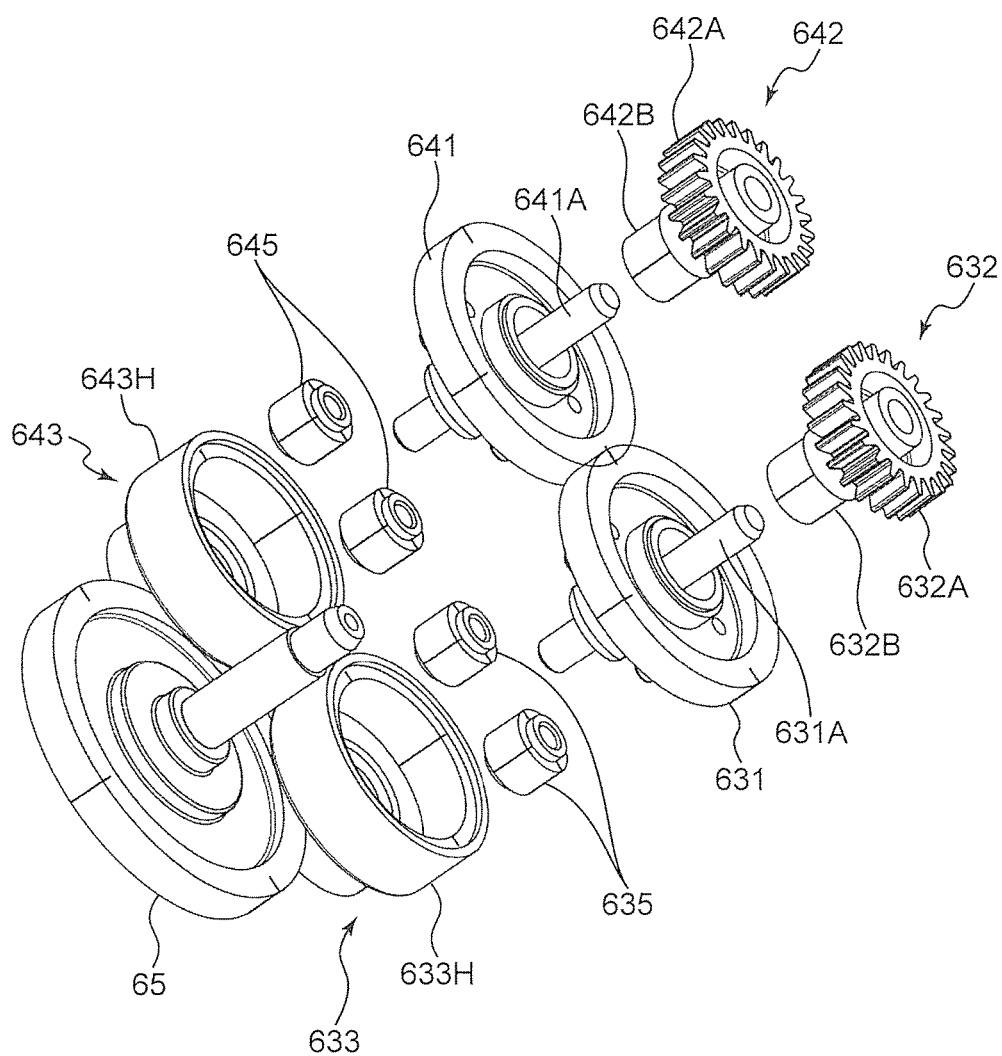
FIG. 12 is an exploded perspective view of the planetary gear mechanism of the drive transmission device according to the one embodiment of the present disclosure.
Figure 13A:
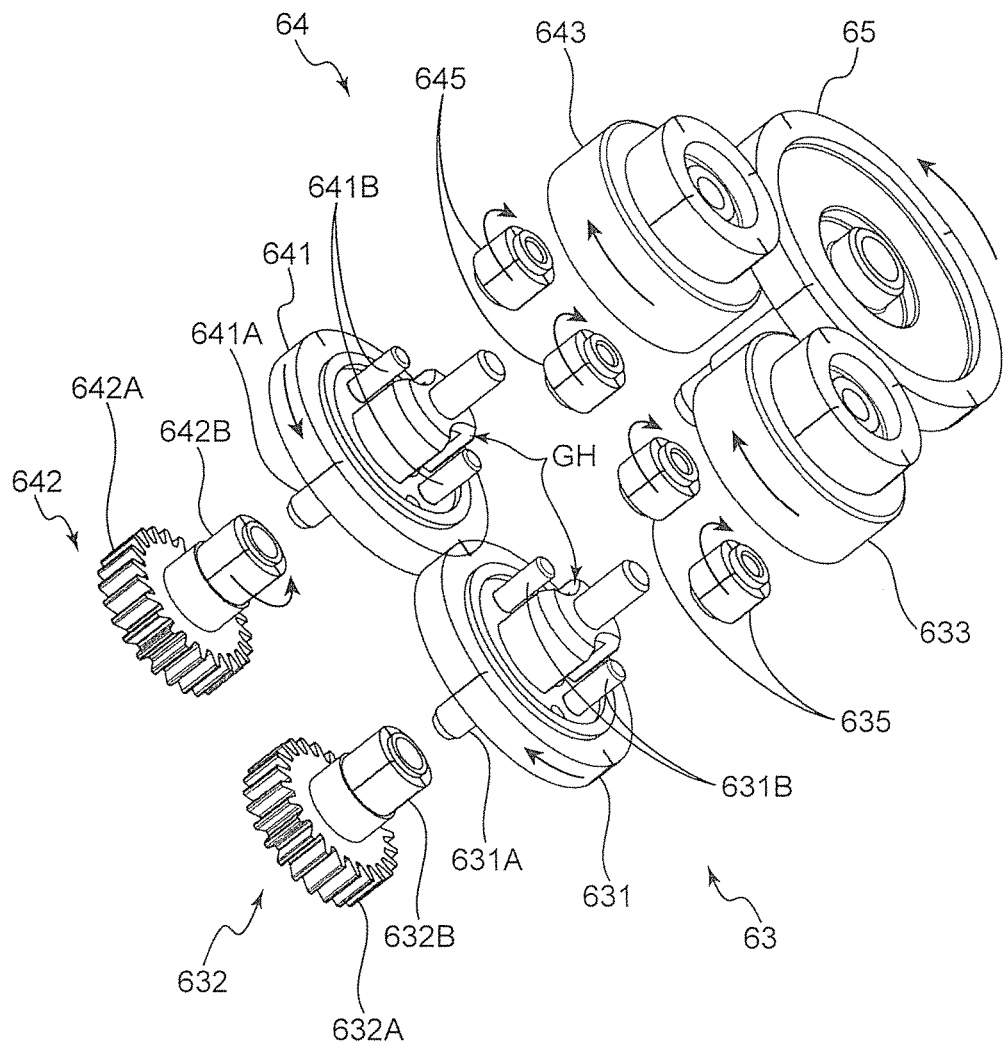
FIG. 13A is an exploded perspective view of the planetary gear mechanism of the drive transmission device according to the one embodiment of the present disclosure.
Figure 13B:
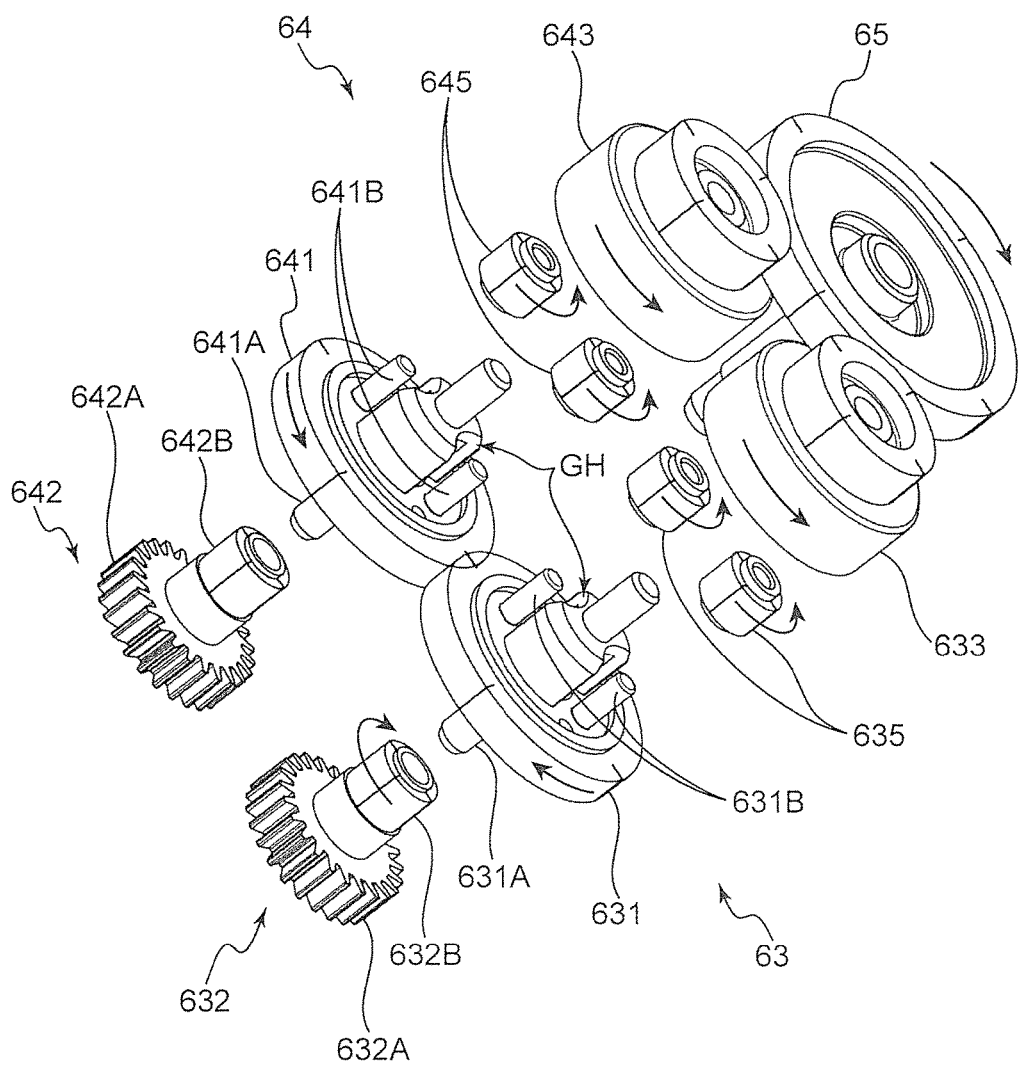
FIG. 13B is an exploded perspective view of the planetary gear mechanism of the drive transmission device according to the one embodiment of the present disclosure.

Next, a detailed structure of the planetary gear mechanism 62 is described with reference to FIGS. 7 to 13B in addition to FIGS. 2 to 6. FIG. 7 is a back view of the interior of the driving unit 6 according to this embodiment. FIG. 8 is a right side view of the driving unit 6. FIG. 9 is a front view of the planetary gear mechanism 62 of the driving unit 6. FIG. 10 is a sectional view along line A-A of FIG. 9 of the planetary gear mechanism 62. FIG. 11 is an exploded sectional view of the planetary gear mechanism 62 of FIG. 10. FIGS. 12, 13A and 13B are exploded perspective views of the planetary gear mechanism 62 of FIG. 10. Note that FIGS. 12 and 13A (13B) are equivalent to views of the planetary gear mechanism 62 viewed from different directions. Further, although FIGS. 13A and 13B are views showing the same members, a rotating direction of each gear is different. FIG. 13A shows a case where the sheet discharge rollers 241 are rotated in the forward direction (rotated in the first direction) and FIG. 13B shows a case where the sheet discharge rollers 241 are rotated in the reverse direction (rotated in the second direction).

The first planetary gear mechanism 63 includes the first carrier 631 (first input gear), a first sun gear 632, a first inner gear 633 (first output gear) and a pair of first planetary gears 635.

With reference to FIG. 7, the first carrier 631 is coupled to the first gear 61 and the rotational drive force of the motor 60 is input to the first carrier 631. Further, as shown in FIGS. 10 and 11, the first carrier 631 includes a first shaft 631A (first shaft portion) extending in the front-rear direction. The first sun gear 632 and the first inner gear 633 are externally fitted on the first shaft 631A from front and rear. Further, the first carrier 631 is coupled to a second carrier 641 to be described later. Further, a pair of shaft portions 631B project on one side part of the first carrier 631 (FIG. 13A). The first planetary gears 635 are respectively rotatably supported on this pair of shaft portions 631B.

The first inner gear 633 is arranged on the same axis as the first carrier 631 and faces one side part of the first carrier 631. The first inner gear 633 is externally fitted on the first shaft 631A from rear. As shown in FIG. 7, the outer portion (the first outer gear portion) of the first inner gear 633 is engaged with the transmission gear 65 and transmits the rotational drive force to the transmission gear 65. Further, as shown in FIGS. 10 and 11, the first inner gear 633 includes a first hollow cylindrical portion 633H (output gear hollow cylindrical portion). The first hollow cylindrical portion 633H is a hollow cylindrical part arranged to cover the one side part (revolutionary path of the first planetary gear 635) of the first carrier 631.

As described above, the pair of first planetary gears 635 are arranged to be capable of rotating and revolving in the first hollow cylindrical portion 633H. The first planetary gears 635 are capable of rotating about the shaft portions 631B and revolving about the first shaft 631A by being engaged with a gear (first inner peripheral gear portion) formed on the inner peripheral surface of the first inner gear 633. As a result, the rotational drive force is transmitted between the first carrier 631 and the first inner gear 633 via the pair of first planetary gears 635. Further, the first planetary gears 635 are engageable with a gear portion 632B (FIG. 13A) (first exposed gear portion) of the first sun gear 632. With reference to FIG. 13A, the gear portion 632B of the first sun gear 632 inserted into the hollow cylindrical interior (input gear hollow cylindrical portion) of the first carrier 631 is exposed from an opening GH of the first carrier 631. As a result, the gear portion 632B and the first planetary gears 635 are engageable.

The first sun gear 632 is arranged on the same axis as the first carrier 631 and the first inner gear 633, and faces another side part of the first carrier 631. The first sun gear 632 is externally fitted on the first shaft 631A from front. The first sun gear 632 is rotatable about the first shaft 631A. A first projection 703A of a rotary arm 70 to be described later is engageable with a restricted portion 632A (FIG. 13A) of the first sun gear 632. As a result, the rotation of the first sun gear 632 about the first shaft 631A is restricted or permitted. If the rotation of the first sun gear 632 about the first shaft 631A is restricted, the first carrier 631 relatively rotates with respect to the first sun gear 632.

Similarly to the first planetary gear mechanism 63, the second planetary gear mechanism 64 includes the second carrier 641 (second input gear), a second sun gear 642, a second inner gear 643 (second output gear) and a pair of second planetary gears 645.

With reference to FIG. 7, the second carrier 641 is coupled to the first carrier 631 and the rotational drive force of the motor 60 is input from the first carrier 631 to the second carrier 641. Further, as shown in FIGS. 10 and 11, the second carrier 641 includes a second shaft 641A extending in the front-rear direction. The second sun gear 642 and the second inner gear 643 are externally fitted on the second shaft 641A from front and rear. Further, a pair of shaft portions 641B project on one side part of the second carrier 641 (FIG. 13A). The second planetary gears 645 are respectively rotatably supported on this pair of shaft portions 641B.

The second inner gear 643 is arranged on the same axis as the second carrier 641 and faces one side part of the second carrier 641. The second inner gear 643 is externally fitted on the second shaft 641A from rear. As shown in FIG. 7, the outer portion (the second outer gear portion) of the second inner gear 643 is engaged with the transmission gear 65 and transmits the rotational drive force to the transmission gear 65. Further, as shown in FIGS. 10 and 11, the second inner gear 643 includes a second hollow cylindrical portion 643H (output gear hollow cylindrical portion). The second hollow cylindrical portion 643H is a hollow cylindrical part arranged to cover the one side part (revolutionary path of the second planetary gear 645) of the second carrier 641.

As described above, the pair of second planetary gears 645 are arranged to be capable of rotating and revolving in the second hollow cylindrical portion 643H. The second planetary gears 645 are capable of rotating about the shaft portions 641B and revolving about the second shaft 641A by being engaged with a gear (second inner peripheral gear portion) formed on the inner peripheral surface of the second inner gear 643. As a result, the rotational drive force is transmitted between the second carrier 641 and the second inner gear 643 via the pair of second planetary gears 645. Further, the second planetary gears 645 are engageable with a gear portion 642B (FIG. 13A) (second exposed gear portion) of the second sun gear 642. With reference to FIG. 13A, the gear portion 642B of the second sun gear 642 inserted into the hollow cylindrical interior (second input gear hollow cylindrical portion) of the second carrier 641 is exposed from an opening GH of the second carrier 641. As a result, the gear portion 642B and the second planetary gears 645 are engageable.

The second sun gear 642 is arranged on the same axis as the second carrier 641 and the second inner gear 643 and faces another side part of the second carrier 641. The second sun gear 642 is externally fitted on the second shaft 641A from front. The second sun gear 642 is rotatable about the second shaft 641A. A second projection 703B of the rotary arm 70 to be described later is engageable with a restricted portion 642A (FIG. 13A) of the second sun gear 642. As a result, the rotation of the second sun gear 642 about the second shaft 641A is restricted or permitted. If the rotation of the second sun gear 642 about the second shaft 641A is restricted, the second carrier 641 relatively rotates about the second sun gear 642.

As just described, the rotational drive force is transmitted among the first gear 61 (FIG. 7), the first carrier 631 and the second carrier 641 in the first and second planetary gear mechanisms 63, 64 constituting the planetary gear mechanism 62. The rotational drive force is then transmitted from the first and second inner gears 633, 643 to the transmission gear 65. The rotating direction of the transmission gear 65 can be switched by the first and second planetary gear mechanisms 63, 64. As a result, the sheet discharge rollers 241 are rotated in the first and second directions while the motor 6 is rotated in the forward direction.

Further, with reference to FIG. 4, the switcher 7 includes a solenoid 69 and the rotary arm 70 (switching member).

The rotary arm 70 restricts the rotation of one sun gear while permitting the rotation of the other sun gear by engaging one of the restricted portion 632A (FIG. 13A) of the first sun gear 632 and the restricted portion 642A (FIG. 13A) of the second sun gear 642. The rotary arm 70 is an arm member externally fitted on the transmission gear shaft 65A of the transmission gear 65. The rotary arm 70 includes an arm shaft portion 701, a first arm 702 and a second arm 703 (FIG. 4).

The arm shaft portion 701 serves as a supporting point in the rotation of the rotary arm 70. The arm shaft portion 701 is arranged on the same axis as the transmission gear shaft 65A. Specifically, the arm shaft portion 701 has a hollow cylindrical shape and is externally fitted on the transmission gear shaft 65A.

The first arm 702 extends substantially upward from the arm shaft portion 701 and is coupled to the solenoid 69.

The second arm 703 extends substantially rightward from the arm shaft portion 701 to enter a space between the first and second sun gears 632, 642 from left (FIG. 4). The second arm 703 includes the first projection 703A, the second projection 703B and an arm extending portion 703C. The first projection 703A is a projection projecting downward on a tip part (right end part) of the second arm 703. The first projection 703A is engageable with the restricted portion 632A of the first sun gear 632 according to the rotation of the rotary arm 70 about the arm shaft portion 701 (clockwise rotation). The second projection 703B is a projection projecting upward on a tip part of the second arm 703. The second projection 703B is engageable with the restricted portion 642A of the second sun gear 642 according to the rotation of the rotary arm 70 about the arm shaft portion 701 (counterclockwise rotation). The rotating direction of the transmission gear 65 can be switched by the second arm 703 engaging the first sun gear 632 or the second sun gear 642. The arm extending portion 703C is a projection projecting upward from the second arm 703 on a side closer to the arm shaft portion 701 than the second projection 703B. An unillustrated biasing spring is mounted on the arm extending portion 703C.

The solenoid 69 is controlled according to the rotating direction of the sheet discharge rollers 241 and projects and retracts to correspond to the forward and reverse rotation drives of the driver 6A. The solenoid 69 includes a projecting/retracting shaft 691. The projecting/retracting shaft 691 can change a state thereof between a projecting state to project rightward from the solenoid 69 and a retracting state to retract into the inside of the solenoid 69 from the projecting state. The first arm 702 of the aforementioned rotary arm 70 is coupled to a tip part (right end part) of the projecting/retracting shaft 691. The solenoid 69 moves the rotary arm 70 to engage the second arm 703 of the rotary arm 70 with the second sun gear 642 against a biasing force of the biasing spring to be described later in accordance with the reverse rotation drive of the driver 6A. Specifically, the solenoid 69 rotates the rotary arm 70 about the arm shaft portion 701 and engages the second projection 703B with the restricted portion 642A (FIG. 13A) of the second sun gear 642.

Further, the driving unit 6 includes a biasing portion 6C (FIG. 4). The biasing portion 6C biases the transmission gear shaft 65A of the transmission gear 65 toward the driver 6A. The biasing portion 6C is composed of the second arm 703 and the unillustrated biasing spring described above. The biasing spring is a spring member extending from a fixing portion inside the apparatus body 10 and to be engaged with the arm extending portion 703C of the second arm 703. The biasing spring biases the second arm 703 rightward and downward. As a result, the transmission gear shaft 65A arranged on the same axis as the first arm 702 is biased rightward and downward. The biasing spring biases the rotary arm 70 toward the first sun gear 632 and engages the first projection 703A of the rotary arm 70 with the restricted portion 632A of the first sun gear 632. Thus, an engagement destination of the rotary arm 70 is switched between the first and second sun gears 632 and 642 according to the projecting and retracting motions of the solenoid 69.

<Forward Rotation Drive of Sheet Discharge Rollers>

Next, the forward rotation drive (arrow D1 of FIGS. 2 and 3) of the sheet discharge rollers 241 by the driving unit 6 is described. With reference to FIG. 5, the solenoid 69 is set in the projecting state to correspond to the forward rotation drive of the sheet discharge rollers 241. Specifically, the projecting/retracting shaft 691 projects in a direction of an arrow D61 of FIG. 5 from the solenoid 69. As a result, the rotary arm 70 rotates about the arm shaft portion 701 and the first projection 703A of the second arm 703 engages the first sun gear 632 (arrow D62 of FIG. 5). Thus, the rotation of the first sun gear 632 is restricted.

With reference to FIG. 5, when the rotation of the motor 60 (FIG. 4) is started, the first gear 61 is rotated in a direction of an arrow D601 of FIG. 5 (an arrow D91 of FIG. 7). Along with this, the first carrier 631 of the first planetary gear mechanism 63 engaged with the first gear 61 rotates in a direction of an arrow D602 of FIG. 5 (an arrow D92 of FIG. 7) and an arrow direction of FIG. 13A. Further, the second carrier 641 engaged with the first carrier 631 rotates in a direction of an arrow D603 of FIG. 5 (an arrow D94 of FIG. 7) and an arrow direction of FIG. 13A. At this time, since the rotation of the first sun gear 632 is restricted by the first projection 703A as described above, the first carrier 631 and the first inner gear 633 (an arrow D93 of FIG. 7) rotate in the same direction via the pair of planetary gears 635. As a result, the first inner gear 633 rotates in an arrow direction of FIG. 13A. On the other hand, the rotation of the second sun gear 642 is permitted by the second projection 703B. Thus, the second carrier 641 and the second inner gear 643 (an arrow D95 of FIG. 7) rotate in opposite directions and the second inner gear 643 rotates in an arrow direction of FIG. 13A. Then, the transmission gear 65 engaged with the first and second inner gears 633, 643 rotates in a direction of an arrow D604 of FIG. 5 (an arrow D96 of FIG. 7) and an arrow direction of FIG. 13A.

Further, with reference to FIG. 5, along with the above rotation of the transmission gear 65, the second gear 66, the third gear 67 and the sheet discharge roller gear 68 respectively rotate in directions of arrows D605, D606 and D607. As a result, the sheet discharge rollers 241 are rotated in the direction of the arrow D1 (first direction) of FIGS. 2 and 3 and the sheet is conveyed in a direction of an arrow D21 of FIG. 2, an arrow D41 of FIG. 3 and an arrow DS1 of FIG. 5. Specifically, the sheet is discharged to the sheet discharging portion (FIG. 1).

<Reverse Rotation Drive of Sheet Discharge Rollers>

Next, the reverse rotation drive (arrow D2 of FIGS. 2 and 3) of the sheet discharge rollers 241 by the driving unit 6 is described. Note that, in this embodiment, the sheet discharge rollers 241 are controlled from the forward rotation drive to the reverse rotation drive in a state where a leading end side of the sheet is exposed upwardly of the sheet discharging portion 13 and the trailing edge of the sheet is sandwiched by the sheet discharge roller pairs 24. As a result, the sheet is conveyed to the reversing conveyance path 22B (FIGS. 1 and 2). With reference to FIG. 6, the solenoid 69 is set in the retracting state to correspond to the reverse rotation drive of the sheet discharge rollers 241. Specifically, the projecting/retracting shaft 691 retracts in a direction of an arrow D71 of FIG. 6 into the inside of the solenoid 69. As a result, the rotary arm 70 rotates about the arm shaft portion 701 in the reverse direction and the second projection 703B of the second arm 703 engages the second sun gear 642 (arrow D72 of FIG. 6). Thus, the rotation of the second sun gear 642 is restricted.

At this time, as described above, the biasing spring biases the arm extending portion 703C rightward and downward. Thus, the second arm 703 of the rotary arm 70 is moved upward against a biasing force of the biasing spring.

With reference to FIG. 6, when the rotation of the motor 60 (FIG. 4) is started, the first gear 61 is rotated in a direction of an arrow D701 of FIG. 6. Specifically, the rotating direction of the first gear 61 is the same as the direction of the arrow D601 of FIG. 5 described above. Along with this rotation, the first carrier 631 of the first planetary gear mechanism 63 engaged with the first gear 61 rotates in a direction of an arrow D702 of FIG. 6 and an arrow direction of FIG. 13B. Further, the second carrier 641 engaged with the first carrier 631 rotates in a direction of an arrow D703 of FIG. 6 and an arrow direction of FIG. 13B. At this time, since the rotation of the first sun gear 632 is permitted by the first projection 703A as described above, the first carrier 631 and the first inner gear 633 rotate in opposite directions via the pair of first planetary gear mechanisms 635. As a result, the first inner gear 633 rotates in an arrow direction of FIG. 13B. On the other hand, since the rotation of the second sun gear 642 is restricted by the second projection 703B, the second carrier 641 and the second inner gear 643 rotate in the same direction via the pair of planetary gears 645 and the second inner gear 643 rotates in an arrow direction of FIG. 13B. Then, the transmission gear 65 engaged with the first and second inner gears 633, 643 rotates in a direction of an arrow D704 of FIG. 6 and an arrow direction of FIG. 13B. As just described, the rotating directions of the first gear 61, the first carrier 631 and the second carrier 641 during the reverse rotation drive of the sheet discharge rollers 241 are the same as those during the forward rotation drive. However, as shown in a transmission path (broken line) of the rotational drive force in FIGS. 5 and 6, the number of the meshed gears differs between during the forward rotation and during the reverse rotation, wherefore the rotating direction of the output (transmission gear 65) is reversed.

Further, with reference to FIG. 6, along with the above rotation of the transmission gear 65, the second gear 66, the third gear 67 and the sheet discharge roller gear 68 respectively rotate in directions of arrows D705, D706 and D707. As a result, the sheet discharge rollers 241 are rotated in the direction of the arrow D2 (second direction) of FIGS. 2 and 3 and the sheet is conveyed in a direction of an arrow D22 of FIG. 2, an arrow D42 of FIG. 3 and an arrow DS2 of FIG. 6. Specifically, the sheet is conveyed into the reversing conveyance path 22B (FIGS. 1 and 2).

<Concerning Meshing Noise of Sun Gear and Planetary Gear>

In the planetary gear mechanism configured as described above, the rotation of one of the first and second sun gears 632, 642 is restricted. In the case of forward rotation of the sheet discharge rollers 241, the rotation of the first sun gear 632 of the first planetary gear mechanism 63 of FIG. 13A is restricted. At this time, in the second planetary gear mechanism 64, the second carrier 641 and the second inner gear 643 are rotated in directions opposite to each other. As a result, the second sun gear 642 idly rotates at a high speed by meshing between the pair of second planetary gears 645 and the gear portion 642B. In such a configuration, a problem that meshing noise is significant in meshing between the pair of second planetary gears 645 and the gear portion 642B of the second sun gear 642 was newly found out.

Similarly, in the case of reverse rotation of the sheet discharge rollers 241, the rotation of the second sun gear 642 of the second planetary gear mechanism 64 of FIG. 13B is restricted. At this time, in the first planetary gear mechanism 63, the first carrier 631 and the first inner gear 633 are rotated in directions opposite to each other. As a result, the first sun gear 632 idly rotates at a high speed by meshing between the pair of first planetary gears 635 and the gear portion 632B. Also in such a configuration, a problem that meshing noise is significant in the meshing between the pair of first planetary gears 635 and the gear portion 632B of the first sun gear 632 was newly found out.

The above meshing noise was found to be significant when a rotational speed of each carrier (first carrier 631 or second carrier 641) is 200 rpm or higher. In this embodiment, the rotational speed of the first sun gear 632 or the second sun gear 642 at this time reaches 1600 rpm.

In this embodiment, to reduce the meshing noise in the planetary gear mechanism on the side where the rotation of the sun gear is not restricted as just described, meshed parts of the gear portion 632B of the first sun gear 632 and the pair of planetary gears 635 and meshed parts of the gear portion 642B of the second sun gear 642 and the pair of secondary planetary gears 645 are characterized. Although the meshed parts of the gear portion 642B of the second sun gear 642 and the pair of second planetary gears 645 are described below, the meshed parts of the gear portion 632B of the first sun gear 632 and the pair of planetary gears 635 also have similar characteristics.

Figure 14:
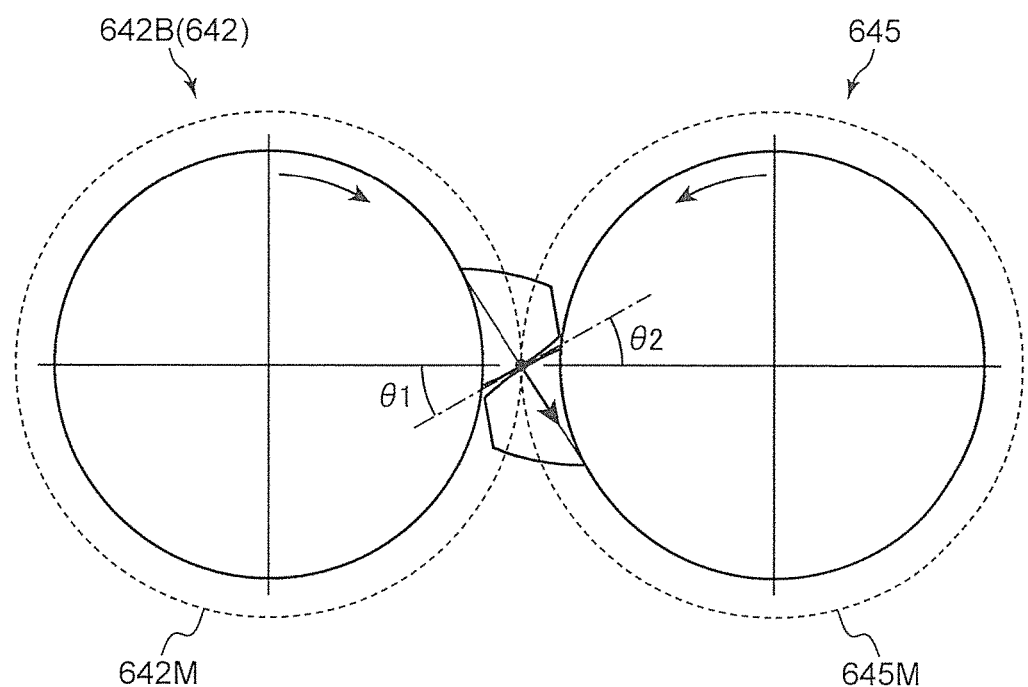
FIG. 14 is a schematic diagram showing pressure angles of a sun gear and a planetary gear according to the one embodiment of the present disclosure.
Figure 15:
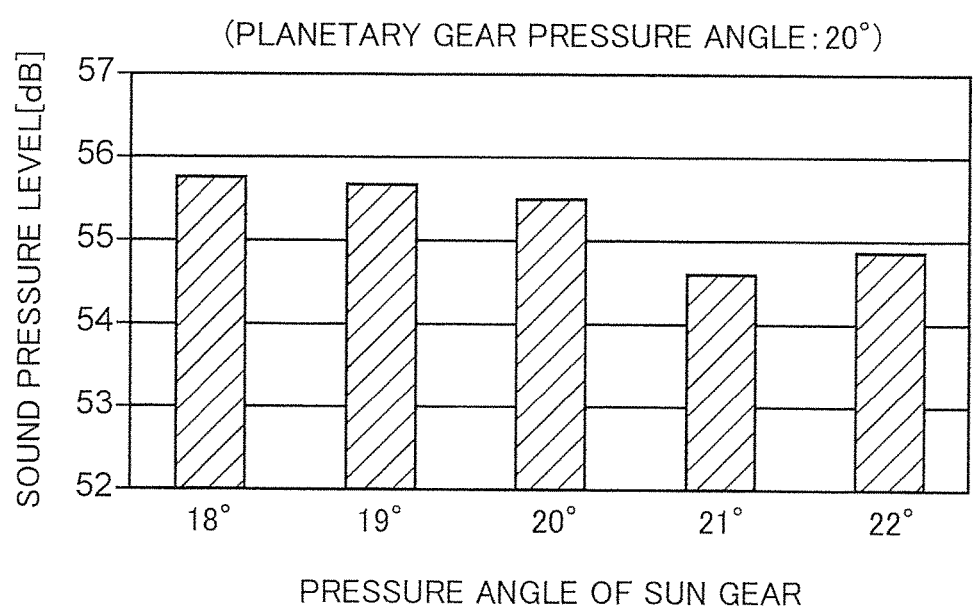
FIG. 15 is a graph showing a relationship of the pressure angle of the sun gear and a sound pressure level of meshing noise.

FIG. 14 is a diagram showing pressure angles of the gear portion 642B of the second sun gear 642 and the second planetary gear 645 according to this embodiment. Further, FIG. 15 is a graph showing a relationship between the pressure angle of the gear portion 642B of the second sun gear 642 and a sound pressure level of the meshing noise. A pitch circle 642M of the gear portion 642B of the second sun gear 642 and a pitch circle 645M of the second planetary gear 645 are shown in FIG. 14. A pressure angle θ1 (θ1B) of the gear portion 642B of the second sun gear 642 is an angle formed between a tangent to a tooth surface of the gear portion 642B on the pitch circle 642M and a line segment connecting centers of rotation of the both gears. Similarly, a pressure angle θ2 (θ2B) of the second planetary gear 645 is an angle formed between a tangent to a tooth surface of the second planetary gear 645 on the pitch circle 645M and the line segment connecting centers of rotation of the both gears.

As shown in FIG. 15, if the pressure angle θ1 of the gear portion 642B of the second sun gear 642 is changed with the pressure angle θ2 of the second planetary gear 645 fixed at 20°, the sound pressure level of the meshing noise changes. Note that, in the evaluation of the sound pressure level shown in FIG. 15, the second carrier 641 (FIG. 13B) is rotated at 257.79 rpm and the second sun gear 642 is rotated at 2062.34 rpm. Further, representative various factors of each gear are as follows.

Various factors of the gear portion 642B of the second sun gear 642

Spur gear (twist angle: 0°), module: 0.5, pressure angle: changed with 20° as a center, the number of teeth: 13 teeth Various factors of the second planetary gear 645

Spur gear (twist angle: 0°), module: 0.5, pressure angle: 20°, the number of teeth: 12 teeth Note that an undercut is avoided by plus transition in either gear part. An undercut limit tooth number when the pressure angle is 20° is 17 teeth. Thus, both tooth numbers are desirably set at 16 teeth or less.

With reference to FIG. 15, the sound pressure level of the meshing noise is minimized by setting the pressure angle θ1 of the gear portion 642 of the second sun gear 642 to 21°. Note that, in addition to data shown in FIG. 15, it was found out that the sound pressure level of the meshing noise became lower in a range of 20°<θ1≤22°, became even lower in a range of 20.5°<θ1≤22° and became lowest in a range of 21°θ1≤22° as a result of further minutely changing the pressure angle θ1 of the gear portion 642B of the second sun gear 642.

Further, it was found out that the meshing noise was stably reduced if the following relational expression was satisfied as a result of changing the pressure angle θ2 of the second planetary gear 645 from 18° to 22° to change the pressure angle θ1 of the gear portion 642B of the corresponding second sun gear 642.

$$\text{Pressure angle } \theta2+0.5°\leq\text{pressure angle } \theta1\leq\text{pressure angle } \theta2+1.5° \quad \text{(Equation 1)}$$

Note that, as described above, also in the first planetary gear mechanism 63, the meshing noise of the both gears is reduced if the pressure angle θ1 (θ1A) of the gear portion 632B of the first sun gear 632 and the pressure angle θ2 (θ2A) of the gear portion 642B of the second sun gear 642 satisfy the above Equation 1.

As described above, according to this embodiment, the rotating direction of the sheet discharge rollers 241 can be switched with the motor 60 kept driven to rotate in the forward direction by restricting the rotation of one of the first and second sun gears 632, 642 by the rotary arm 70 of the switcher 7. Further, the meshing noise of the exposed gear portion of the sun gear and the planetary gears is suppressed in the planetary gear mechanism in which the rotation of the sun gear is not restricted.

Further, in this embodiment, even if the rotational speed of each carrier (first carrier 631, second carrier 642) is set at a high rotational speed like 200 rpm, the meshing noise of the gear portion of the sun gear and the planetary gear is suppressed.

Further, in this embodiment, at least one of the gear portion of the sun gear and the planetary gear has 16 teeth or less, whereby the meshing noise of the gear portion of the sun gear and the planetary gear is suppressed even if the rotational speed of the gear portion of the sun gear is set high.

Further, in this embodiment, the gear teeth of the gear portion of the sun gear can be protected by enclosing the gear portion of the sun gear by the aforementioned input gear hollow cylindrical portion. Further, since an outer peripheral part of the gear portion of the sun gear can be exposed by as much as necessary to be meshed with the planetary gear, noise caused by the vibration of the gear portion of the sun gear can be contained.

Further, since the planetary gear can be covered by the aforementioned output gear hollow cylindrical portion, the meshing noise of the exposed gear portion of the sun gear and the planetary gear can be further suppressed.

The driving unit 6 according to the embodiment of the present disclosure and the sheet conveying device 2 and the image forming apparatus 1 provided with the same have been described above. According to such configurations, the sheet conveying device and the image forming apparatus are provided in which the meshing noise of the exposed gear portion of the sun gear and the planetary gear is suppressed. Note that the present disclosure is not limited to this and, for example, the following modification can be employed.

Although the sheet discharge rollers 241 have been described as a rotary body in the above embodiment, the present disclosure is not limited to this. Another rotary body may be rotationally driven by the driving unit 6.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A drive transmission device, comprising:
a rotary body including a rotary shaft and configured to rotate about the rotary shaft in a first rotating direction and a second rotating direction opposite to the first rotating direction;
a driver including a motor switchable between drive stop and forward rotation drive and capable of converting a rotational drive force generated by the motor in the forward rotation drive into mutually different rotating directions; and
a transmitter configured to rotate the rotary body in the first rotating direction and the second rotating direction by transmitting the rotational drive force from the driver to the rotary body; the transmitter including a transmission gear coupled to the transmitter;
wherein:
the driver includes:
  a first planetary gear mechanism coupled to the motor and the transmission gear and configured to transmit the rotational drive force of the motor to the transmission gear;
  a second planetary gear mechanism coupled to the first planetary gear mechanism and the transmission gear and configured to transmit the rotational drive force of the motor to the transmission gear; and
  a switcher configured to change rotating directions of the first and second planetary gear mechanisms in correspondence with a rotating direction of the rotary body;
the first planetary gear mechanism includes:
  a first input gear having a first shaft portion, the rotational drive force of the motor being input to the first input gear;
  a first output gear having a first outer peripheral gear portion to be engaged with the transmission gear and a first inner peripheral gear portion, arranged to face one side part of the first input gear on the same axis as the first input gear, rotatable about the first shaft portion and configured to transmit the rotational drive force to the transmission gear;
  a first sun gear having a first exposed gear portion exposed on the one side part of the first input gear, arranged to face another side part of the first input gear on the same axis as the first input gear and rotatable about the first shaft portion; and
  a first planetary gear supported in such a manner as to be capable of rotating and revolving about the first shaft portion on the one side part of the first input gear and engaged with the first inner peripheral gear portion and the first exposed gear portion;
the second planetary gear mechanism includes:
  a second input gear having a second shaft portion and engaged with the first input gear, the rotational drive force of the motor being input to the second input gear;
  a second output gear having a second outer peripheral gear portion to be engaged with the transmission gear and a second inner peripheral gear portion, arranged to face one side part of the second input gear on the same axis as the second input gear, rotatable about the second shaft portion and configured to transmit the rotational drive force to the transmission gear;
  a second sun gear having a second exposed gear portion exposed on the one side part of the second input gear, arranged to face another side part of the second input gear on the same axis as the second input gear and rotatable about the second shaft portion; and
  a second planetary gear supported in such a manner as to be capable of rotating and revolving about the second shaft portion on the one side part of the second input gear and engaged with the second inner peripheral gear portion and the second exposed gear portion;
the switcher includes a switching member configured to engage one of the first and second sun gears, thereby restricting the rotation of the one sun gear and permitting the rotation of the other sun gear;
the transmission gear is rotated in a third rotating direction by the first and second output gears to rotate the rotary body in the first rotating direction when the rotation of the first sun gear is restricted by the switching member, and the transmission gear is rotated in a fourth rotating direction opposite to the third rotating direction by the first and second output gears to rotate the rotary body in the second rotating direction when the rotation of the second sun gear is restricted by the switching member; and
relationships of:

$$\theta 2A + 0.5° \leq \theta 1A \leq \theta 2A + 1.5°, \text{ and}$$

$$\theta 2B + 0.5° \leq \theta 1B \leq \theta 2B + 1.5°$$

are satisfied if θ1A(°) denotes a pressure angle of gear teeth of the first exposed gear portion of the first sun gear and θ2A(°) denotes a pressure angle of gear teeth of the first planetary gear in meshing between the gear teeth of the first exposed gear portion and the gear teeth of the first planetary gear and θ1B(°) denotes a pressure angle of gear teeth of the second exposed gear portion of the second sun gear and θ2B(°) denotes a pressure angle of gear teeth of the second planetary gear in meshing between the gear teeth of the second exposed gear portion and the gear teeth of the second planetary gear.

2. A drive transmission device according to claim 1, wherein:
the first and second input gears are rotated at a rotational speed of 200 (rpm) or higher.

3. A drive transmission device according to claim 1, wherein:
at least either the gear teeth of the first exposed gear portion of the first sun gear or the gear teeth of the first planetary gear are 16 teeth or less; and
at least either the gear teeth of the second exposed gear portion of the second sun gear or the gear teeth of the second planetary gear are 16 teeth or less.

4. A drive transmission device according to claim 1, wherein:
the first and second input gears respectively include input gear hollow cylindrical portions for enclosing the first and second exposed gear portions and a part of the first exposed gear portion and a part of the second exposed gear portion are exposed via openings formed in the input gear hollow cylindrical portions to be engageable with the first planetary gear and the second planetary gear.

5. A drive transmission device according to claim 1, wherein:
the first and second output gears respectively include output gear hollow cylindrical portions to be coupled to the first and second input gears to cover revolutionary paths of the first and second planetary gears.

6. A sheet conveying device, comprising:
a drive transmission device according to claim 1; and
a conveyor roller configured to convey a sheet, the conveyor roller serving as the rotary body.

7. An image forming apparatus, comprising:
an apparatus body;
an image forming unit arranged in the apparatus body and configured to form an image on a sheet;
a sheet conveyance path configured such that the sheet is conveyed to pass through the image forming unit;
a sheet conveying device according to claim 6 arranged in the sheet conveyance path; and
a sheet discharging portion, the sheet having the image formed thereon being discharged to the sheet discharging portion.

* * * * *